Sept. 7, 1926.

S. GAZSE

SPRING WHEEL

Filed Nov. 17, 1921

1,599,326

Inventor:
Sandor Gazse,
By A. S. Paré
Attorney.

Patented Sept. 7, 1926.

1,599,326

UNITED STATES PATENT OFFICE.

SANDOR GAZSE, OF SAN FRANCISCO, CALIFORNIA.

SPRING WHEEL.

Application filed November 17, 1921. Serial No. 515,947.

This invention relates to wheels, for automobiles or other vehicles.

The main object of the invention is to produce a spring wheel having its resiliency adjacent to the rim thereof.

To this end I construct a wheel having two rims, spaced apart, and having in the space between them a series of coil springs radially disposed. Details of the structure will be described hereinafter, in connection with the drawing.

In the accompanying one sheet of drawing I have illustrated a wheel containing my invention.

Figure 1:
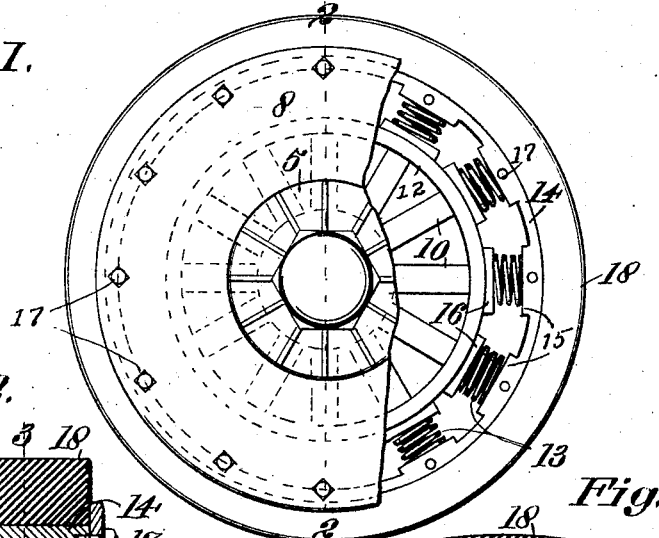
Figure 1 is a face view of the wheel, partly broken away to show a portion of the interior arrangement thereof.

In the figures:—The axle is represented in conventional form at 1, and the hub thereon at 2. These members may be secured together by nut and washer 3, or in other manner. At each end of hub 2 is a circumferential flange 4 and 5, either of which may be integral with the hub, and either of which may be a part of a sleeve, secured to the hub. Sleeve 6 is such a sleeve having the flange 5 formed as an integral part of it. The flanges 4 and 5 thus form chafing plates for discs 7 and 8, which are parallel to each other, and extend circumferentially a distance depending on the diameter of the wheel.

Between the chafing plates 4 and 5, on the hub 2, are two circumferential flanges, or a ring of sockets, 9, to receive the inner ends of the spokes 10, which may be secured therein by bolts 11. The outer ends of the spokes engage in a rim 12, fitted between the discs 7 and 8, and capable of slight sliding motion therebetween. The rim 12 is mortised to receive the spokes, and has a row of sockets around its outer circumference, in each of which is seated a coil spring 13.

A second rim-ring 14 surrounds the rim 12, and is spaced therefrom, as indicated. The rim 14 has in its inner circumference a row of sockets 15, facing, and in radial register with, the sockets 16 in the inner rim 12. The outer ends of springs 13 are seated in the sockets 15.

It will be observed, that, the spring coils 13 are slightly less in diameter than the sockets 15 and 16, but are wedged therein by the end coils which are larger than the body coils and fit tightly into the sockets. Thus the coils are firmly positioned, but free to move in their action.

Figure 2:
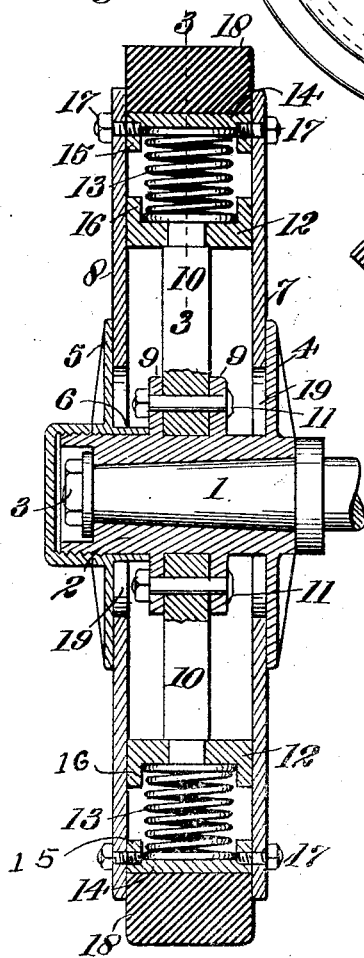
Figure 2 is a cross-section on the line 2, 2, of Figure 1.
Figure 3:
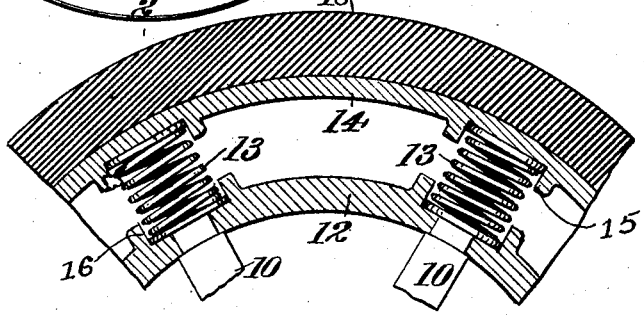
Figure 3 is a fragmentary circumferential section taken at the line 3, 3, of Figure 2.

The discs 7 and 8, may be secured to the outer rim 14, by bolts 17, and project slightly beyond the rim 14 to form a groove for the reception of a rubber, or other, tire 18. The discs 7 and 8, are cut out at the center as at 19 Figure 2, but within the circumference of the chafing plates, to permit their free radial movement.

The operation of the wheel, as above constructed, is as follows. The wheel may be either a driven wheel or a driving wheel, or simply a rolling wheel. The operation will be the same. The weight of the vehicle and its load will be supported by the springs at approximately the lower side of the wheel, and those springs will be compressed, and those diametrically opposite them will expand to correspond, whilst the springs lateral of the upper and lower ones will yield laterally the required degree, but will be held firmly in place by the end coils wedged tightly into the sockets. The same action will take place as the wheel passes over inequalities in the roadway.

In the above action the side discs, 7 and 8, slide radially between the chafing plates, and with the tire and outer rim.

I am aware that various kinds of springs have been positioned between two concentric rims, therefore, I do not claim such construction broadly.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claim.

What I claim and desire to secure by Letters Patent of the United States, is the following, to wit:—

A wheel comprising in combination, a hub having radially extending spokes, an inner rim connecting said spokes, an outer concentric rim spaced from said inner rim, said rims having spring sockets arranged at equal circumferential points, said sockets arranged to register with each other and retain a series of coil spacing springs therebetween, said springs provided with outer and inner end coils of larger diameter than the central coils thereof and adapted to wedge within said spring sockets to hold said outer and inner rims in their relative positions with respect to the direction of travel.

In testimony that I claim the foregoing I have hereto set my hand, this 31 day of October, 1921.

SANDOR GAZSE.